US006953140B2

United States Patent
Park et al.

(10) Patent No.: US 6,953,140 B2
(45) Date of Patent: Oct. 11, 2005

(54) FRICTION STIR WELDING APPARATUS OF PISTON FOR SWASH PLATE TYPE COMPRESSOR WITH VARIABLE CAPACITY

(75) Inventors: Dae-Kyu Park, Seoul (KR); Kyoung-Duck Kim, Seoul (KR)

(73) Assignee: Halla Climate Control Corporation, Daejon-si (KR)

( * ) Notice: Subject to any disclaimer, the term of this patent is extended or adjusted under 35 U.S.C. 154(b) by 0 days.

(21) Appl. No.: 10/657,092

(22) Filed: Sep. 9, 2003

(65) Prior Publication Data

US 2005/0051599 A1 Mar. 10, 2005

(51) Int. Cl.[7] .................. B23K 20/12; B23K 37/00; B23K 31/02
(52) U.S. Cl. .................. 228/2.1; 228/112.1
(58) Field of Search ................ 228/2.1, 112.1

(56) References Cited

U.S. PATENT DOCUMENTS

| 5,460,317 | A | | 10/1995 | Thomas et al. |
| 6,259,052 | B1 | * | 7/2001 | Ding et al. ............... 219/59.1 |
| 6,364,197 | B1 | * | 4/2002 | Oelgoetz et al. .......... 228/112.1 |
| 2001/0040179 | A1 | * | 11/2001 | Tochigi et al. ............. 228/2.1 |
| 2003/0047590 | A1 | * | 3/2003 | Okamoto et al. .......... 228/127 |
| 2004/0155092 | A1 | * | 8/2004 | Onuma et al. ........... 228/112.1 |

FOREIGN PATENT DOCUMENTS

| EP | 0 959 227 A2 | 11/1999 |
| EP | 1 046 453 A | 10/2000 |
| JP | 11-156560 A | 6/1999 |
| JP | 11-1565670 | 6/1999 |
| JP | 2000-042759 A | 2/2000 |

* cited by examiner

Primary Examiner—Lynne R. Edmondson
(74) Attorney, Agent, or Firm—Lowe, Hauptman & Berner, LLP (57) ABSTRACT

A friction stir welding apparatus of a piston for variable capacity swash plate type compressor bonds two pistons through frictions stir welding without forming a hole in welded portions of the piston members. The friction stir welding apparatus includes: A support that rotatably supports coaxially coupled first and second pistons. A welder, rotatably inserted into welded portions of the first and second pistons supported on the support, performs friction stir welding along the rotation direction of the first and second pistons. Support rollers elastically mounted on the lower portions of the pistons have central axis lines of the piston members on central axis lines of the rotation support while the pistons are supported on the support. The rollers vertically move through a predetermined height while supporting the pistons. The welder is transferred from the welded portions to another position after welding of the welded portions.

19 Claims, 9 Drawing Sheets

FRICTION STIR WELDING APPARATUS OF PISTON FOR SWASH PLATE TYPE COMPRESSOR WITH VARIABLE CAPACITY

BACKGROUND OF THE INVENTION

1. Field of the Invention

The present invention relates to a friction stir welding apparatus of a piston for a swash plate type compressor with variable capacity. More particularly, the present invention relates to a friction stir welding apparatus of a piston for a swash plate type compressor with variable capacity, which integrally bonds two round sections of piston members through friction stir welding without forming a hole in welded portions of the piston members, thereby improving durability of the welded portions and easily bonding the piston members regardless of the size of the outer diameter of the piston members.

2. Background of the Related Art

In general, a swash plate type compressor with variable capacity of a cooling apparatus of an automobile includes: front and rear housings forming sealed spaces therein, such as a crank chamber, a suction chamber, a discharge chamber, and so on; a cylinder block installed between the front and rear housings and having a number of cylinder bores arranged in the circumferential direction thereof; a driving shaft rotatably mounted on the center of the cylinder block; a lug plate and a swash plate respectively mounted on the driving shaft; a number of pistons coupled along the circumference of the swash plate via shoes; a valve unit disposed between the cylinder block and the rear housing; a control valve for controlling the movement of the pistons; and a spring elastically mounted on the swash plate for supporting the swash plate at the minimum slope angle when the lug plate does not rotate.

In such a swash plate type compressor with variable capacity, weight of the piston acts as inertia preventing reciprocating motion of the piston during a refrigerant compressing process, thereby deteriorating compression efficiency. To solve the above problem, the piston is manufactured of light-weight material, and recently, the piston has a hollow part formed therein for more light weight.

Conventionally, to manufacture the hollow piston, a first piston member and a second piston member are molded separately, wherein the first piston member has a bridge having a shoe pocket for seating shoes connecting the piston and the swash plate therein, and the second piston member has a hollow part. After that, the first and second piston members are temporarily coupled to each other after mechanical processing, and then, the coupled surfaces of the first and second piston members are welded and adhered to each other by electron beam welding under a vacuum condition.

However, the conventional hollow piston manufacturing method has several problems in that it is necessary to process the coupled surfaces precisely, that it takes too much time to assemble the first and second piston members, and that it is complex and difficult to process the first and second piston members, so that its productivity is deteriorated, and defective rate becomes too high. Furthermore, the conventional hollow piston manufacturing method has another problem in that durability of the piston is lowered as fine holes are formed inside the piston during the electron beam welding step. The conventional hollow piston manufacturing method has a further problem in that refrigerant and oil are run short because the refrigerant and oil permeate inside the hollow portion through the fine holes. Particularly, the conventional hollow piston manufacturing method has a problem in that maintenance and manufacturing costs are increased as the welding area of the piston must be kept in a high vacuum condition for the electron beam welding.

To solve the above problems, European Patent Publication No. 0,959,227 discloses a friction welding method in which after the first and second piston members are molded, parallel joint surfaces are respectively formed on the front surfaces of the first and second piston members, and then, a hollow piston part is formed by frictional heat generated by the first and second piston members to each other under a state where the two joint surfaces face to each other in an atmospheric condition.

However, under the above conventional method, the welding temperature is not uniformly distributed on the joint surface due to a minute difference in flatness of the joint surface as the joint surface is flat, and so, it is difficult to uniformly keep the welding strength of the joint surface. Additionally, the temperature and the welding strength are gradually increased toward the outer circumference of the pistons due to a difference in angular velocity on the joint surface of the first and second piston members. However, the welding strength of the remaining portions becomes relatively lower as the outer circumferential layer is removed by mechanical processing after the welding.

Meanwhile, U.S. Pat. No. 5,460,317 discloses a friction stir butt welding method, which is different from the above friction welding method. In U.S. Pat. No. 5,460,317, the surface of a continuous or substantially continuous material is provided with a probe of material, which is harder than that of the above material. After the above material and the probe are contacted to each other, the probe is inserted into the material, and at the same time, relatively periodic motion occurs between the probe and the material. A plasticised region is formed in the material around the probe by frictional heat generated by the periodic motion. Then, the material is bonded by coagulating the material.

Such a friction stir butt welding method has an advantage in that it has little defect, such as deformation due to thermal distortion, without restriction in kinds of material. However, the friction stir butt welding method has a disadvantage in that a hole is formed in the friction portion between the materials by the probe after the friction welding.

Figure 8:
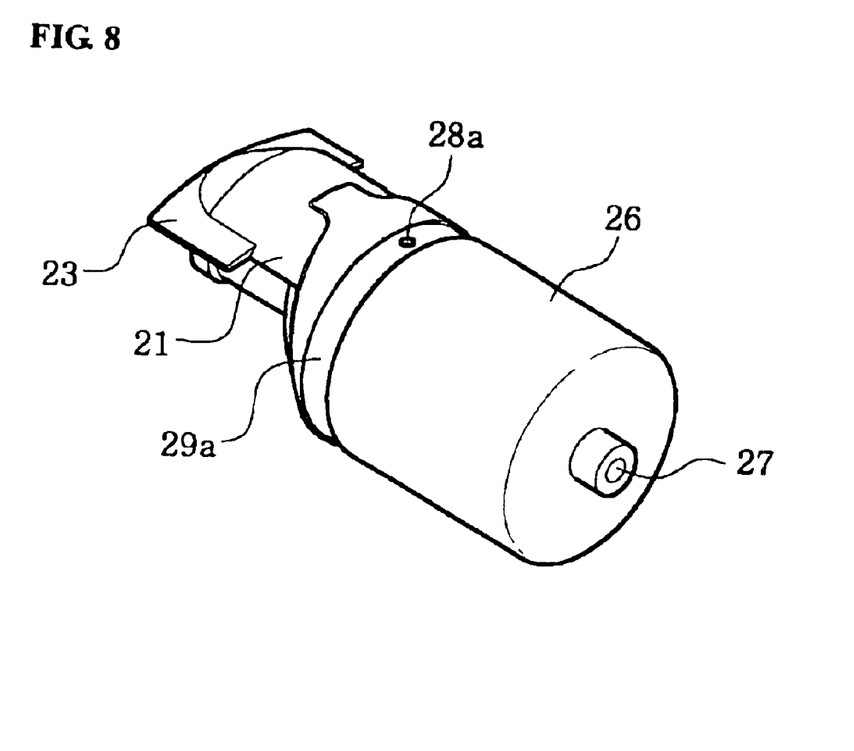
FIG. 8 is a view showing a state in which a piston is welded by prior art.

As shown in FIG. 8, in manufacturing a piston 1, the friction stir butt welding method has a disadvantage in that it is impossible to form coating film of uniform thickness during a coating process after the friction welding and durability of the welded portion is deteriorated because a hole 5 is formed in a friction portion, i.e., welded portion, between the first piston member 3 having a bridge 2 and the second piston member 4.

That is, as the second piston member 4 of the piston 1 used for the swash plate type compressor with variable capacity is rubbed against the inner surfaces of the cylinder bores during reciprocating motion of the piston 1, for abrasion resistance and sealability of the outer circumference of the second piston member 4, a uniform coating film is formed on the outer circumference of the second piston member 4 including the welded portions, and then, an abrasion process is performed as a post-process. Therefore, as described above, if the hole is formed in the welded portion between the piston members, coating liquid penetrates into the hole. When plastic working is performed in this condition, an elevated portion is formed at the position of the hole 5, and so, the coating film is not uniform.

Therefore, an abrasion process can be performed eccentrically, thereby resulting in lowering of durability.

The friction stir butt welding method has other disadvantages in that there is possibility to cause bending deformation on the members by pressure when the probe is inserted into the welded portion between the two members, and so, it is difficult to manufacture the piston, which must have a precise outer diameter.

To prevent the bending deformation, Japanese Patent laid-open Publication No. Hei 11-156560 discloses a friction stir welding apparatus of preventing bending of piston members, in which one or more support rollers being in contact with the outer circumferences of piston members are installed at the opposite side of the probe, namely, under the two piston members. The support rollers support pressure generated when the probe is inserted, thereby preventing bending of the piston members.

However, because the support rollers are installed under a state in which they are fixed to support the lower portions of the two members, in order to rotate the two members on the fixed support rollers, the two members must have a precise outer diameter to exactly arrange the two members on the central axis line of rotating means.

Therefore, the friction stir welding apparatus of the prior art can manufacture only one kind of piston having the same outer diameter. To manufacture pistons having different outer diameters, it is necessary to change or separately manufacture the welding apparatus according to the outer diameter, thereby increasing the manufacturing costs.

SUMMARY OF THE INVENTION

Accordingly, the present invention has been made in view of the above described problems, and an object of the present invention is to provide a friction stir welding apparatus of a piston for a swash plate type compressor with variable capacity, which prevents formation of a hole in a welded portion between two piston members, which are coupled integrally to each other by friction stir welding, thereby preventing lowering of durability of the welded portions during a coating process and an abrasion process after the friction stir welding.

Another object of the present invention is to provide a friction stir welding apparatus of a piston for a swash plate type compressor with variable capacity, which can easily bond the piston members with each other regardless of the outer diameter size of the piston members.

To achieve the above objects, according to the present invention, there is provided a friction stir welding apparatus which includes: rotation supporting means mounted on the top surface of a table, the rotation supporting means rotatably supporting the first piston member and the second piston member, the first piston member having a bridge and the first coupling part protruding from the bridge, the second piston member having the second coupling part coupled with the first coupling part of the first piston member and a hollow part formed by being coupled with the first piston member; welding means rotatably inserted into welding portions of the first and second piston members supported on the rotation supporting means, for carrying out friction stir welding along the rotation direction of the first and second piston members; support rollers elastically mounted on the lower side of the first and second piston members to arrange central axis lines of the first and second piston members on central axis lines of the rotation supporting means when the first and second piston members are supported on the rotation supporting means, the support rollers vertically moving within a predetermined height (H) range while supporting the first and second piston members; and transferring means for transferring the welding means from the welded portions to a predetermined position after the friction stir welding of the welded portions by means of the welding means.

A guide member for controlling exact position of the central axis lines is detachably installed on the upper side of the rotation supporting means, and the guide member exactly controls the central axis line of the second piston member against the central axis line of the rotation supporting means while pressurizing the upper surface of the second piston member temporarily coupled to the first piston member, so that the central axis line of the first piston member elastically installed on the support rollers is coincided with the central axis line of the rotation supporting means.

The transferring means has a servo-motor for transferring the table to a predetermined distance in an axial direction of the piston.

Two support rollers are rotatably mounted adjacently with each other on two supporting members, which are movably mounted on the upper portion of a fixed stand fixed on the upper surface of the table.

The fixed stand includes a vertical through-hole, and a ascent and descent member connected with the lower surface of the supporting members through the vertical through-hole, the ascent and descent member being elastically supported by an elastic spring.

The ascent and descent member has the lower portion protruding to the outside of a narrower path than the vertical through-hole, and the protruding end of the ascent and descent member is inclined at a predetermined slant angle.

A fixing means is mounted under the ascent and descent member, the fixing part being for fixing the support rollers by stopping the lifting motion of the ascent and descent member when the first and second piston members are supported on the rotation supporting means after the control axis line of the piston members is coincided with that of the rotation supporting means.

The fixing means includes: a wedge type fixing member having the front end inclined like the end of the ascent and descent member, a horizontal through-hole formed therein, and a movable rod elastically supported by the elastic spring inside the horizontal through-hole; and a connection member connected to an end of the movable rod protruding to the outside of the horizontal through-hole of the wedge type fixing member.

An air cylinder is connected to an end of the connection member, and moves the connection member back and forth, so that the wedge type fixing member is advanced to or returned from the end side of the ascent and descent member by the connection member.

Additional advantages, objects, and features of the invention will be set forth in part in the description which follows and will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
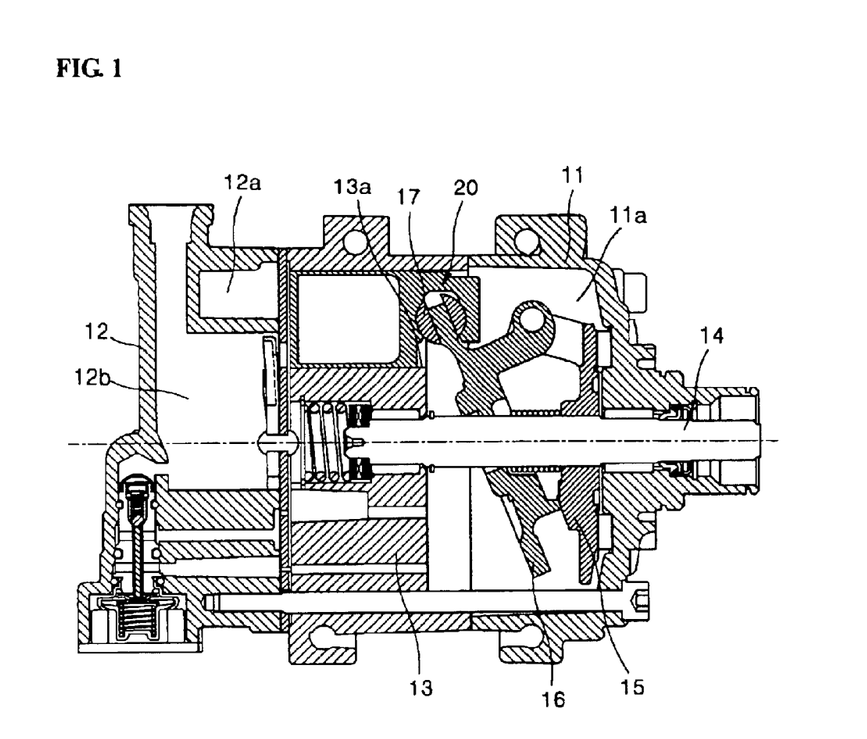
FIG. 1 is a brief sectional view of a swash plate type compressor with variable capacity, to which a piston according to the present invention is adopted.

FIG. 1 briefly shows the structure of a swash plate type compressor with variable capacity, to which a piston according to the present invention is mounted.

As shown in FIG. 1, the swash plate type compressor includes: front and rear housings 11 and 12 forming sealed spaces therein, such as a crank chamber 11a, a suction chamber 12a, and a discharge chamber 12b; a cylinder block 13 installed between the front and rear housings 11 and 12 and having a number of cylinder bores 13a arranged in the circumferential direction; a driving shaft 14 rotatably mounted on the center of the cylinder block 13 and having a lug plate 15; a swash plate 16 hinged with a side of the lug plate 15 and having a slant angle varied according to cooling load; and a number of pistons 20 connected with shoes 17, which are provided along the circumference of the swash plate 16, and respectively reciprocating inside each bore 13a of the cylinder block 13 according to rotation of the swash plate 16.

The piston used in the swash plate type compressor with variable capacity has a hollow part formed therein to reduce inertia due to the reciprocating motion.

Figure 2:
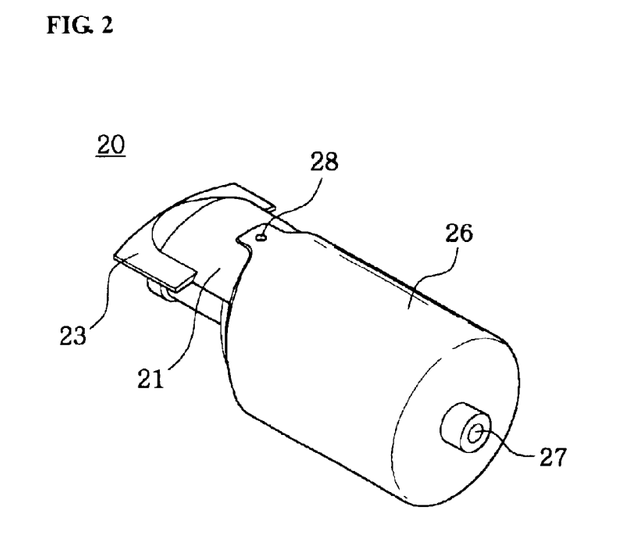
FIG. 2 is a perspective view of the piston of FIG. 1.

FIG. 2 shows the structure of the piston in detail. The piston 20 includes: the first piston member 23 having a bridge 21, which has a shoe pocket therein for seating the shoe connecting the piston and the swash plate, and the first coupling part 22 extending from the bridge 21 in the longitudinal direction; and the second piston member 26 having the second coupling part 24 extending in the longitudinal direction at a side thereof to couple with the first coupling part 22 of the first piston member 23, and the hollow part 25 sealed by the coupling of the first and second piston members 23 and 26.

Moreover, stepped support portions 22a and 24a can be respectively formed at the first coupling part 22 of the first piston member 23 and the second coupling part 24 of the second piston member 26.

The piston 20 is generally manufactured by a friction stir welding method as follows. The first and second piston members 23 and 26 are molded separately, and then, temporarily coupled with each other after mechanical working. Then, after a welding means is in contact with welding portions of the first and second piston members 23 and 26, the welding portions are welded with each other by friction heat generated during the rotation of the first and second piston members 23 and 26.

Figure 3:
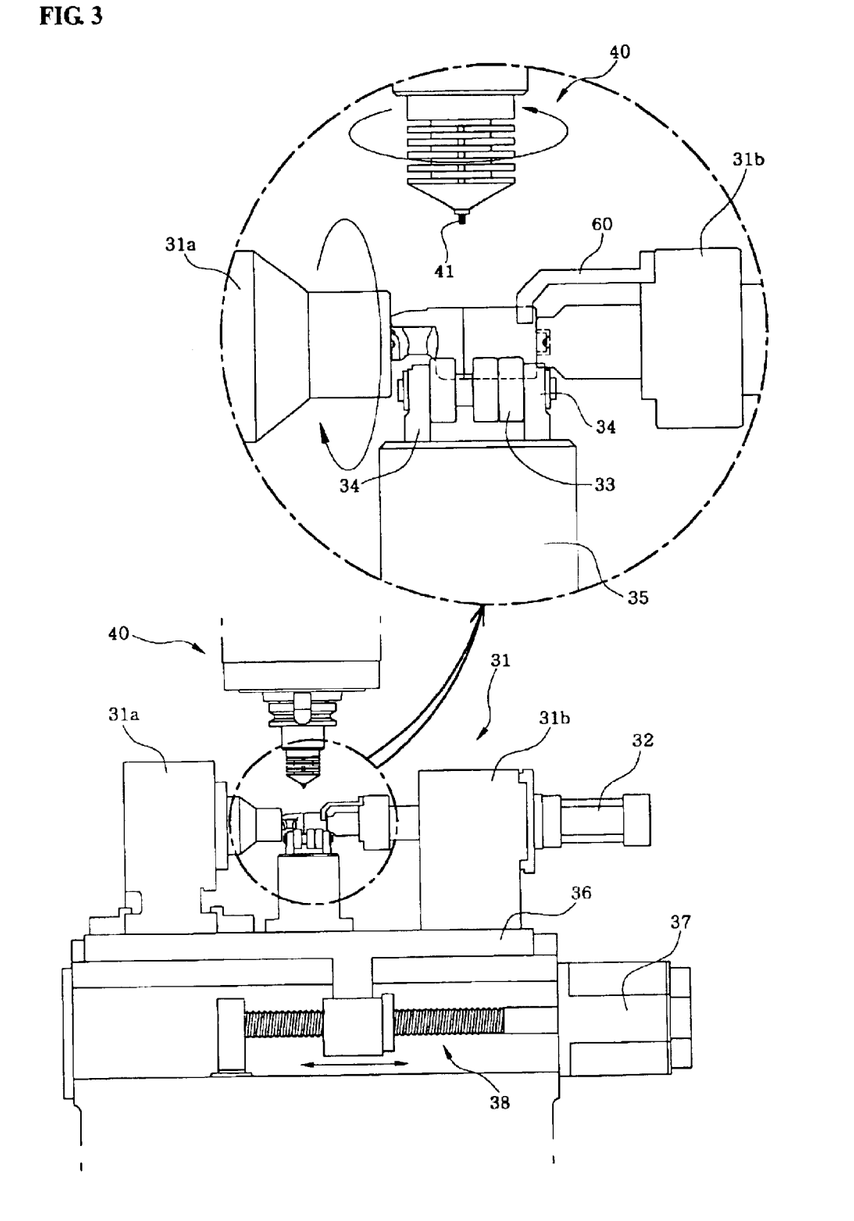
FIG. 3 is a front view of a friction stir welding apparatus of the piston according to the present invention.

FIG. 3 shows a friction stir welding apparatus of the piston for the swash plate type compressor with variable capacity according to the present invention.

As shown in FIG. 3, the friction stir welding apparatus of the piston includes: a rotation supporting means 31 fixed on the upper surface of a table 36 to rotatably support the first and second piston members 23 and 26, which are temporarily coupled facing to each other on the coaxial line; and a welding means 40 being in contact with the welding portions of the first and second piston members 23 and 26, which are supported by the rotation supporting means 31, to weld the welding portions with each other using friction heat.

The rotation supporting means 31 includes: a first supporting part 31a for rotatably supporting a side of the first piston member 23; a second supporting part 31b for rotatably supporting a side of the second piston member 26; and a driving part (not shown) for driving one of the first and second supporting parts 31a and 31b. Of course, the driving part can freely control revolution per minute (RPM) of the first and second supporting parts 31a and 31b. Furthermore, one of the first and second supporting parts 31a and 31b, for example, the second supporting part 31b, is provided with a hydraulic cylinder 32 disposed at an end thereof to move back and forth in an axial direction of the piston.

The welding means 40 includes: a servo-transferring device (not shown) for moving vertically to the welding portions of the first and second piston members 23 and 26 temporarily coupled with each other and supported by the rotation supporting means 31; and a pin type probe 41 disposed on the front end thereof and inserted into the welding portions while being rotated by a spindle motor (not shown) to generate friction heat for welding.

Particularly, support rollers 33 are mounted between the first and second supporting parts 31a and 31b. The support rollers 33 are in contact with the lower portions of the first and second piston members 23 and 26, which are supported by the first and second supporting parts 31a and 31b, to securely keep the temporarily coupled condition of the first and second piston members 23 and 26. As shown in FIGS. 3 and 4, the two support rollers 33, which are adjacent to each other to stably support the cylindrical piston 20, are rotatably mounted on two supporting members 34, which are mounted on the upper portion of a fixed stand 35 fixed on the upper surface of the table 36.

If the piston 20 having the outer diameter of, for example, about 30 mm, namely, the temporarily coupled first and second piston members 23 and 26, are loaded on the support rollers 33, the central axis line of the piston 20 and the central axis line of the rotation supporting means 31 are coincided with each other. In this condition, while the second supporting part 31b of the rotation supporting means 31 is moved toward the first supporting part 31a by the hydraulic cylinder 32, a protrusion (not shown), which is formed on the central portion of both ends of the first and second supporting parts 31a and 31b, is exactly inserted into a center hole 27, which is formed at both ends of the first and second piston members 23 and 26, and thereby, the piston 20 is supported on the first and second supporting parts 31a and 31b. As described above, in the above condition in which the first and second piston members 23 and 26 are supported on the rotation supporting means 31, pressure by the probe 41, which is applied by inserting the probe 41 into the welding portions of the first and second piston members 23 and 26 counteracts to supporting force generated by the support rollers 33, so that the first and second piston members 23 and 26 can be prevented from bending.

However, if the piston 20 having outer diameter larger than the above is loaded on the support rollers 33, the central axis line of the piston 20 and the central axis line of the rotation supporting means 31 are not coincided, and thereby, the piston 20 cannot be supported on the rotation supporting means 31.

To solve the above problem, the present invention is provided with the support rollers 33 capable of elastic ascent and descent movement. According to the elastic ascent and descent movement of the support rollers 33, regardless of the outer diameter of the piston 20, the central axis line of the piston 20 can be exactly coincided with that of the rotation supporting means 31.

Figure 4A:
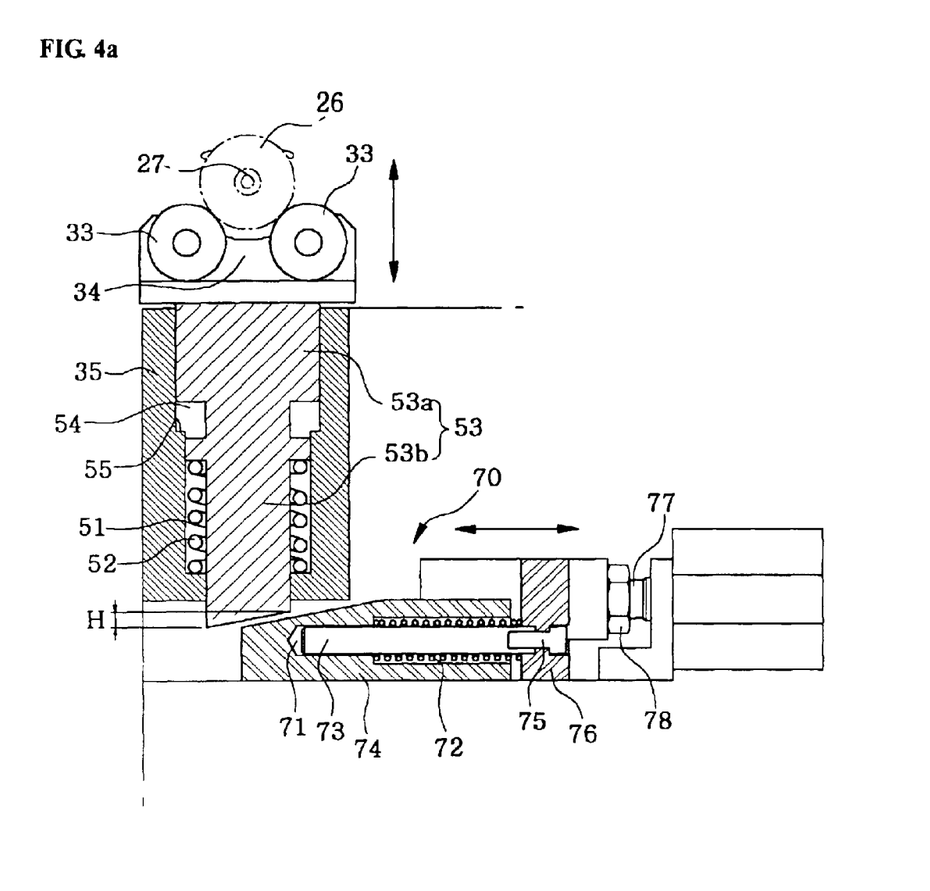
FIG. 4 is a side sectional view of a flexible structure of a support roller of FIG. 3.
Figure 4B:
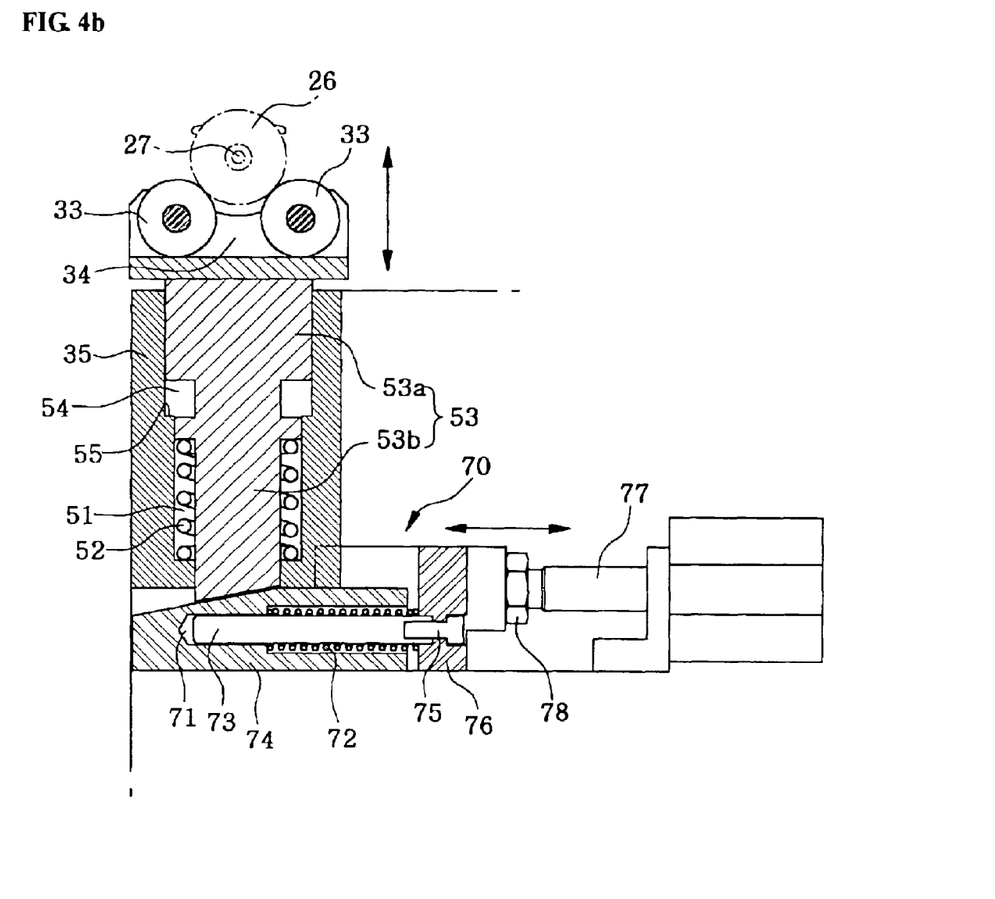

That is, as shown in FIGS. 4a and 4b, the fixed stand 35 disposed on the lower portion of the supporting member 34 for supporting the support rollers 33 has a vertical through-hole 51. An ascent and descent member 53 is inserted into the vertical through-hole 51. The ascent and descent member 53 protrudes vertically from the lower surface of the supporting member 34 and is elastically supported by an elastic spring 52. The ascent and descent member 53 includes the second piston member 53a connected to the lower surface of the supporting member 34, and a supporting rod 53b connected to the lower surface of the second piston member 53a, having the outer diameter smaller than the outer diameter of the second piston member 53a, and having an inclined end. The lower portion of the supporting rod 53b is protruded to the outside through a path narrower than the vertical through-hole 51.

Moreover, the second piston member 53a is provided with a concave groove 54 formed in the outer circumference of the lower portion thereof, and the elastic spring 52 is fit on the outer circumference of the supporting rod 53b. At this time, the front end of the elastic spring 52 is supported on the lower end of the second piston member 53a, and the rear end of the elastic spring 52 is supported on a latch jaw 55 formed on the border between the vertical through-hole 51 and the path.

If the piston 20 of large outer diameter is loaded on the support rollers 33, load force of the piston 20 is applied to the support rollers 33, and the supporting member 34 is elastically moved by the ascent and descent member 53 mounted under the supporting member 34. Therefore, the position of the central axis line can be controlled so that the central axis lines of the piston 20 and the rotation supporting means 31 are coincided with each other.

Figure 5:
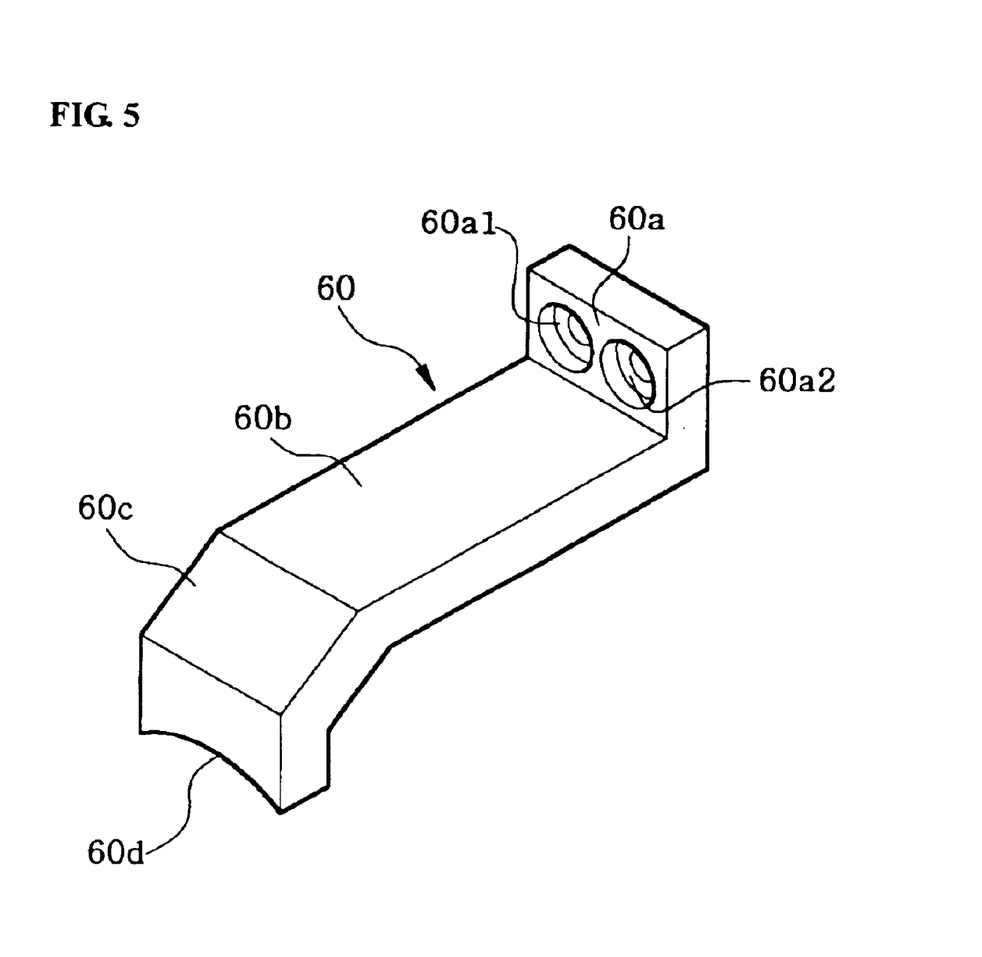
FIG. 5 is a perspective view of a guide member mounted on the upper portion of a second support means of FIG. 3.

At this time, for reliable position control of the central axis lines, as shown in FIG. 5, on the upper portion of one of the supporting parts 31a and 31b, for example, on the upper portion of the second supporting part 31b, mounted is a guide member 60 pressurizing and holding the upper surface of the piston 20, which is elastically moved on the support rollers 33. The guide member 60 includes: a coupling section 60a having coupling holes 60a1 and 60a2 for removably coupling the coupling section 60a to the upper portion of the second supporting part 31b; an extension portion 60b bended and extended from the coupling section 60a in a longitudinal direction; an inclined portion 60c having a predetermined inclined angle from the extension portion 60b; and a holding portion 60d bended vertically from the inclined portion 60c and having an arc-shaped end for holding the outer surface of the front end of the second piston member 26.

As described above, after the central axis lines of the piston 20 is exactly coincided with that of the rotation supporting means 31 by the guide member 60, the piston 20 is supported by the rotation supporting means 31. After the piston 20 is supported on the rotation supporting means 31, it is necessary to fix the ascent and descent member 53 to prevent further movement of the supporting member 34. For this purpose, a fixing means 70 is mounted under the supporting rod 53b of the ascent and descent member 53 to stop the movement of the ascent and descent member 53.

The fixing means 70 includes: a wedge type fixing member 74 having a horizontal through-hole 71 therein, which is inclined like the end of the supporting rod 53b, and a movable rod 73 mounted inside the horizontal through-hole 71 and elastically supported by a elastic spring 72; and a connection member 76 connected to an end of the movable rod 73, which protrudes to the outside of the horizontal through-hole 71 of the wedge type fixing member 74, by a coupling tool 75 such as a bolt. Furthermore, on an end of the connection member 76 connected is an air cylinder 77 for moving the wedge type fixing member 74 by moving the connection member 76 back and forth. Non-explained reference numeral 78 designates the coupling tool such as a bolt.

In the fixing means 70, the connection member 76 is moved back and forth in an arrow direction by pneumatic pressure when the air cylinder 77 is operated, and at the same time, the wedge type fixing member 74 connected to the connection member 76 is moved back and forth. At this time, the movable rod 73 mounted inside the horizontal through-hole 71 of the wedge type fixing member 74 is moved by elasticity of the elastic spring 72, and then, the wedge type fixing member 74 is also gradually moved.

FIG. 4a shows a state in which the wedge type fixing member 74 goes back to an end of the supporting rod 53b of the ascent and descent member 53. In this case, the support rollers 33 are elastically lifted or lowered to the extent of 'H' by the ascent and descent member 53 because there is a gap between the end of the supporting rod 53b and the front end of the wedge type fixing member 74.

In this condition, as shown in FIG. 4b, when the wedge type fixing member 74 is advanced, the inclined front end of the wedge type fixing member 74 is in contact with the inclined end of the supporting rod 53b, and thereby, the ascent and descent member 53 is not moved any more.

Meanwhile, as shown in FIG. 3, the table 36 mounted on the lower portion of the rotation supporting means 31 is connected to a transferring means 38 so as to be moved laterally within a predetermined distance in an axial direction of the piston by a servo-motor 37. Thereby, when the servo-motor 37 is operated under a condition in which the probe 41 is inserted into the welding portion of the piston 20 supported on the rotation supporting means 31, the table 36 is moved within the predetermined distance. The servo-motor 37 for the transferring means can be mounted on the side of table 36 or the welding means 40.

Hereinafter, referring to FIG. 6, a process for manufacturing the piston 20 will be described.

Figure 6A:
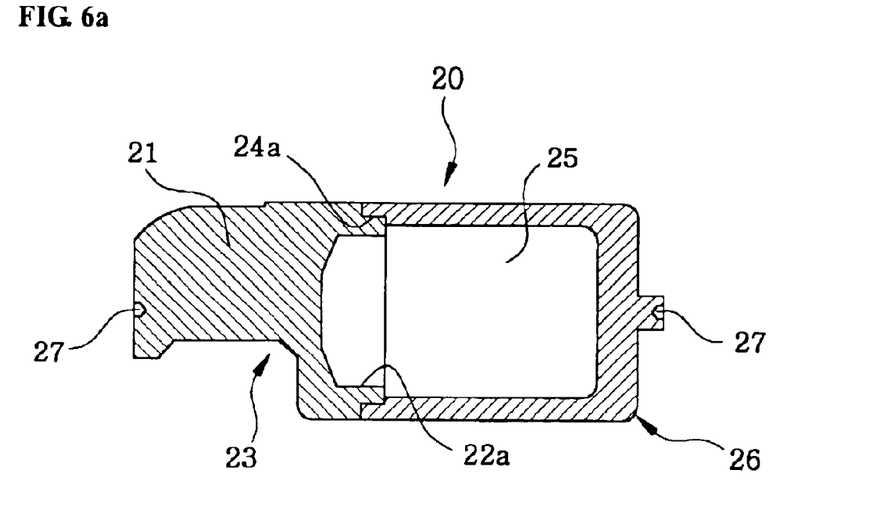
FIGS. 6a to 6e are sectional views showing a friction stir welding process of the piston according to the present invention.

First, the first piston member 23, which has the bridge 21 and the first coupling part 22 extending from the bridge 21, is formed. Then, the second piston member 26, which has the second coupling part 24 coupled with the first coupling part 22 and the hollow part formed by coupling the first piston member 23 and the second piston member 26 with each other, is formed.

As described above, the forming of the first and second piston members 23 and 26 can be carried out through a forging process. Moreover, a step for forming a stepped portion can be further included to keep a coupled condition so that the first coupling part 22 is precisely coupled with the second coupling part 24 of cylinder type.

When the forming of the first and second piston members is finished, as shown in FIG. 6a, the first and second coupling parts 22 and 24 are temporarily coupled with each other.

After that, the temporarily coupled first and second piston members 23 and 26 are loaded on the support rollers 33 between the first and second supporting parts 31a and 31b of the rotation supporting means 31, and then, the first and second piston members 23 and 26 are supported on the first and second supporting parts 31a and 31b. When the second supporting part 31b is advanced toward the second piston member 26 loaded on the support roller 33 by the air cylinder, the protrusion formed on the central portion of the end of the second supporting part 31b is inserted into the center hole 27 formed on the center of the second piston member 26. In this condition, the second supporting part 31b is continuously advanced toward the first supporting part 31a, the center hole 27 of the first piston member 23 temporarily coupled with the second piston member 26 is in contact with the protrusion formed on the end of the first supporting part 31a, so that the first and second piston members 23 and 26 are firmly supported on the first and second supporting parts 31a and 31b.

At this time, if the outer diameter of the first and second piston members 23 and 26, which are loaded on the support rollers 33 moving upwardly and downwardly, is about 30 mm, the central axis lines of the first and second piston members 23 and 26 and supporting parts 31a and 31b are coincided with each other, so that the first and second piston members 23 and 26 are almost never influenced by the guide member 60 mounted on the upper portion of the second supporting part 31b. However, if the outer diameter of the first and second piston members 23 and 26 is larger than the above, the central axis lines are not coincided with each other, and so, the position of the central axis lines must be controlled. In the position controlling step, when the support rollers 33 are moved downwardly under a condition in which the upper portion of the second piston member 26 temporarily coupled with the first piston member 23 is pressed by the guide member 60, the central axis line of the second piston member 26 is coincided with the central axis line of the second supporting part 31b. At this time, the guide member 60 can be replaced with a new one according to the outer diameter of the piston 20 to hold the upper portion of the second piston member 26.

When the position controlling of the central axis lines is finished, the wedge type fixing member 74 of the fixing means 70 mounted under the support rollers 33 is advanced by the air cylinder 77, so that the ascent and descent member 53 is fixed to prevent further movement of the supporting member 34.

Figure 6B:
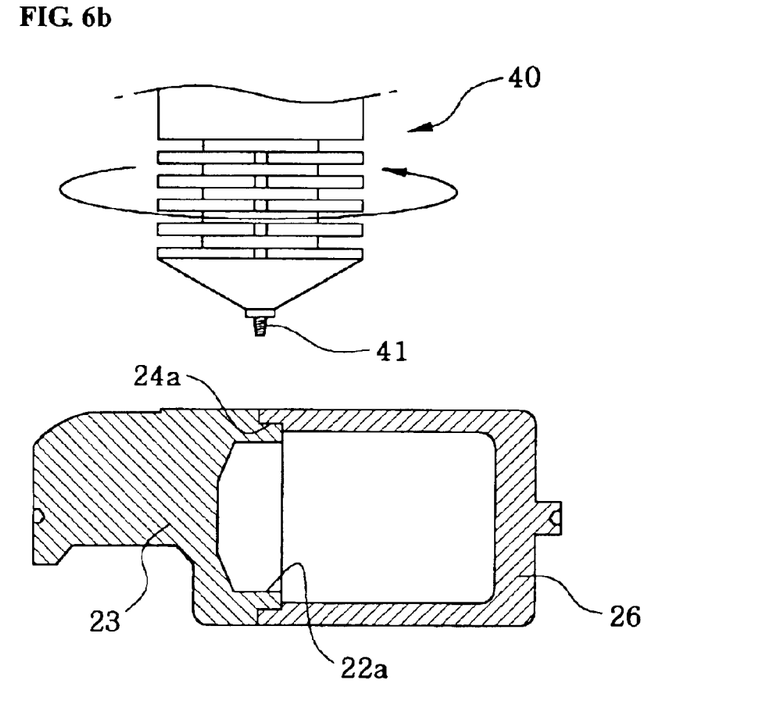
Figure 6C:
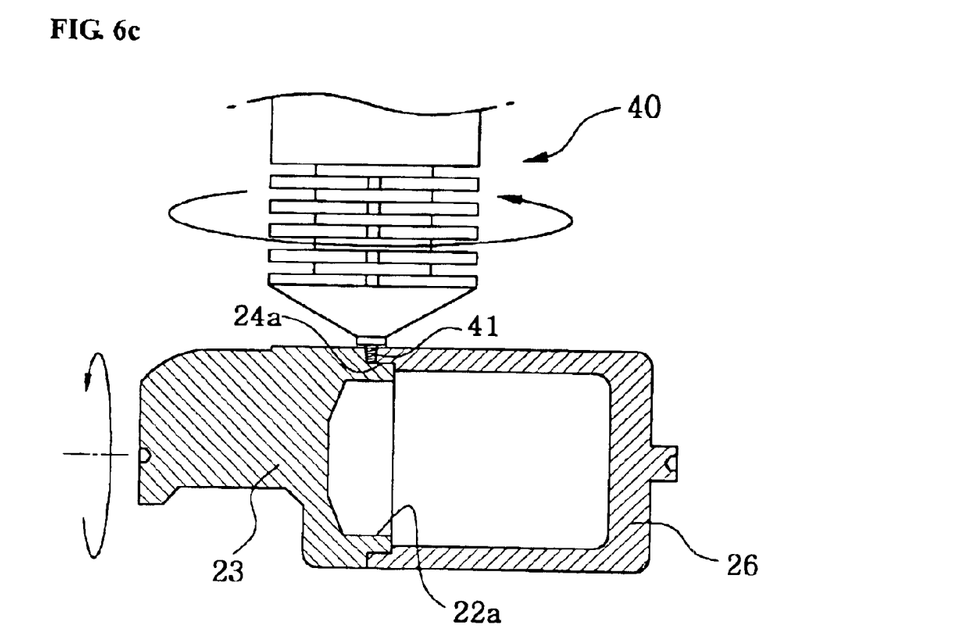

After that, as shown in FIG. 6b, the welding means 40 is advanced downwardly while being rotated by the spindle motor, and then, as shown in FIG. 6c, the probe 41 of the welding means 40 is inserted into the first and second coupling parts 22 and 24, which are the welding portions of the first and second piston member 23 and 26. In this condition, by rotating the first supporting part 31a once, the probe of the welding means 40 welds the first and second coupling parts 22 and 24 using friction heat generated by friction contact while the prove 41 is moving along the trace of the first and second coupling parts 22 and 24 of the first and second piston members 23 and 26.

When the welding of the first and second coupling parts 22 and 24 by the one-time rotation of the rotation supporting means is finished, the welding means 40, which is inserted into the welded portions of the first and second coupling parts 22 and 24, is separated from the welded portions. At this time, when the welding means 40 is separated from the welded portion, as shown in FIG. 8, the hole 5 is formed in a portion contacted with the welding means 40 (the portion is included in a coating area), and so, coating fluid is penetrated into the hole 5 during a coating process after the welding. In this condition, when the plastic working and abrasion process are performed, the thickness of the coating film may not be uniform, and durability may be considerably lowered.

Figure 6D:
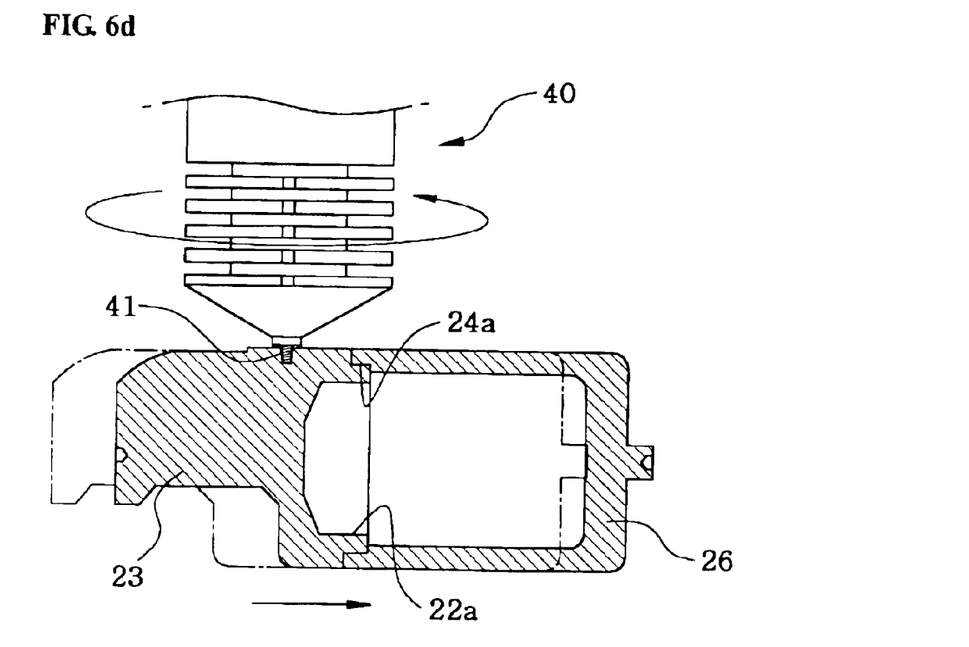

Therefore, to solve the above problems, before separating the welding means 40 from the welded portion, as shown in FIG. 6d, the servo-motor 37 is operated to move the table 36 mounted under the rotation supporting means 31 in the axial direction of the piston, and thereby shifting the position of a hole 28 from the welded portion to a non-coating area to prevent formation of the hole in the welded portion.

Figure 6E:
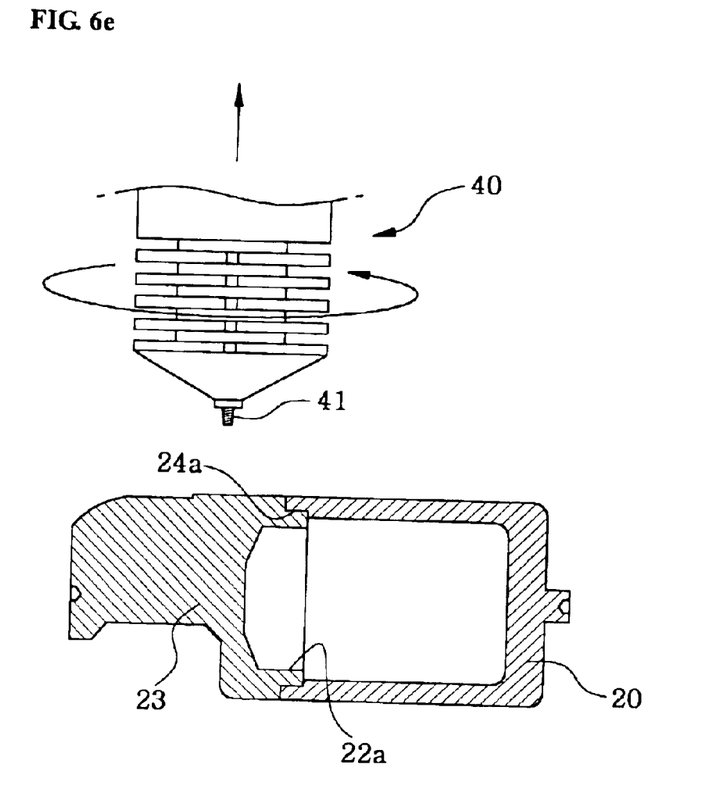

By the above moving step, when the position of the hole 28 is moved to the bridge 21 portion of the first piston member 23, which is the non-coating area, as shown in FIG. 6e, the welding means 40 is returned to its original position from the first and second coupling parts 22 and 24 of the first and second piston members 23 and 26 by the spindle motor.

Figure 7:
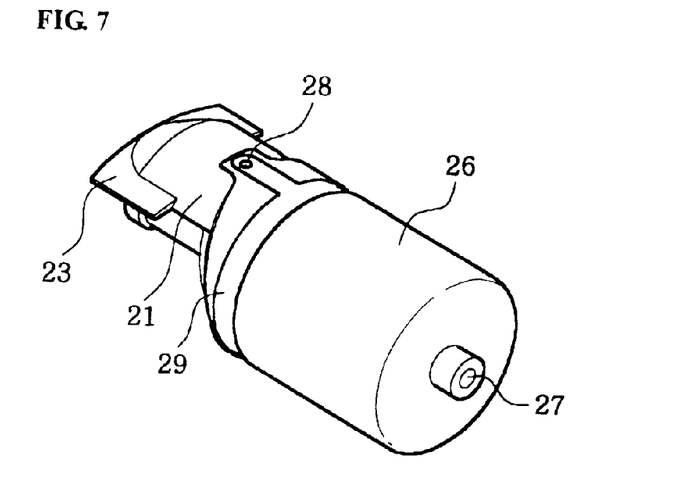
FIG. 7 is a view showing a state in which a piston is welded according to the present invention.

FIG. 7 shows the structure of the piston 20 manufactured by the above method. After the friction welding, the hole 28 formed by the probe 41 of the welding means 40 is shifted to the bridge 21 portion of the first piston member 23.

Non-explained reference numeral 29 designates the trace of the probe 41 of the welding means 40 formed on the welded portions of the first and second coupling parts 22 and 24 of the first and second piston members 23 and 26.

As described above, after the welding means is inserted into the welding portions of the two piston members supported by the rotation supporting means and the friction stir welding is performed, the rotation supporting means is moved to a predetermined distance to form the hole in the non-coating area, so that the welding strength of the welded portions is increased and the coating film can be formed uniformly on the coated area of the piston during the coating process after the welding, and thereby, durability of the piston can be increased.

Furthermore, according to the present invention, the support rollers are elastically moved upwardly and downwardly to keep the temporarily coupled condition of the two piston member, so that the central axis lines of the two piston members can be easily coincided with the central axis line of the rotation supporting means regardless of the outer diameter of the piston, and thereby, the piston can be freely manufactured size by size.

While the present invention has been described with reference to the particular illustrative embodiments, it is not to be restricted by the embodiments but only by the appended claims. It is to be appreciated that those skilled in the art can change or modify the embodiments without departing from the scope and scope of the present invention.

What is claimed is:

1. A friction stir welding apparatus of a piston for a swash plate type compressor with variable capacity, the friction stir welding apparatus comprising:

first and second supporting parts mounted on the top surface of a table, the first and second supporting parts rotatably supporting a first piston member and a second piston member, the first piston member having a bridge and a first coupling part protruding from the bridge, the second piston member having a second coupling part coupled with the first coupling part of the first piston member and a hollow part coupled with the first piston member;

a welder rotatably insertable into welding portions of the first and second piston members supported by the first and second supporting parts, the welder being arranged for carrying out friction stir welding along the rotation direction of the first and second piston members;

support rollers elastically mounted on the lower side of the first and second piston members for causing central axis lines of the first and second piston members to be on central axis lines of the first and second supporting parts while the first and second piston members are supported on the first and second supporting parts, the support rollers being arranged for vertical movement within a predetermined height range while supporting the first and second piston members; and a structure for transferring the welder from the welded portions to a bridge portion of the first piston member after the friction stir welding of the welding portions by the welder.

2. The friction stir welding apparatus according to claim 1, further including a guide member for controlling the position of the central axis lines, the guide member being detachably mounted on the upper portion of the second supporting part, and the guide member being arranged to exactly position the central axis line of the second piston member onto the central axis line of the second supporting part while applying pressure to the upper surface of the second piston member temporarily coupled to the first piston member for causing the central axis line of the first piston member to be elastically lifted or lowered by the support rollers and coincide with the central axis line of the first supporting part.

3. A friction stir welding apparatus of a piston for a swash plate type compressor with variable capacity, the friction stir welding apparatus comprising:

first and second supporting parts mounted on the top surface of a table, the first end second supporting parts rotatably supporting a first piston member and a second piston member, the first piston member having a bridge and a first coupling part protruding from the bridge, the second piston member having a second coupling part coupled with the first coupling part of the first piston member and a hollow part coupled with the first piston member;

a welder rotatably insertable into welding portions of the first and second piston members supported by the first and second supporting parts, the welder being arranged for carrying out friction stir welding along the rotation direction of the first and second piston members;

support rollers elastically mounted on the lower side of the first and second piston members for causing central axis lines of the first and second piston members to be on central axis lines of the first and second supporting parts while the first and second piston members are supported on the first and second supporting parts, the support rollers being arranged for vertical movement within a predetermined height range while supporting the first and second piston members; and a structure for transferring the welder from the welded portions to a predetermined position, the structure including a servo-motor for transferring the table through a predetermined distance in an axial direction of the piston.

4. The friction stir welding apparatus according to claim 1, wherein at least two of the support rollers are rotatably mounted adjacent to each other on a plurality of supporting members, which are mounted an the upper portion of a stand fixed to the upper surface of the table(36).

5. A friction stir welding apparatus of a piston for a swash plate type compressor with variable capacity, the friction stir welding apparatus comprising:

first and second supporting parts mounted on the top surface of a table, the first and second supporting parts rotatably supporting a first piston member and a second piston member, the first piston member having a bridge and a first coupling part protruding from the bridge, the second piston member having a second coupling part coupled with the first coupling part of the first piston member and a hollow part coupled with the first piston member;

a welder rotatably insertable into welding portions of the first and second piston members supported by the first and second supporting parts, the welder being arranged for carrying out friction stir welding along the rotation direction of the first and second piston members;

support rollers elastically mounted on the lower side of the first and second piston members for causing central axis lines of the first and second piston members to be on central axis lines of the first and second supporting parts while the first and second piston members are supported on the first and second supporting parts, the support rollers being arranged for vertical movement within a predetermined height range while supporting the first and second piston members; and a structure for transferring the welder from the welded portions to a predetermined position, at least two of the support rollers being rotatably mounted adjacent to each other on a plurality of supporting members, which are mounted an the upper portion of a stand fixed to the upper surface of the table the fixed stand including a vertical through-hole, and an ascent and descent member connected with the lower surface of the supporting member inside the vertical through-hole, the ascent and descent member being elastically supported by an elastic spring.

6. The friction stir welding apparatus according to claim 5, wherein the ascent and descent member has a lower portion protruding to the outside of a narrower path than the vertical through-hole, and the protruding end of the ascent and descent member is inclined at a predetermined slant angle.

7. The friction stir welding apparatus according to claim 5, wherein a stabilizer is mounted under the ascent and descent member, the stabilizer being arranged for fixing the supporting member by stopping the movement of the ascent and descent member in response to the first and second piston members being supported on the first and second supporting parts rotation.

8. The friction stir welding apparatus according to claim 6, wherein a stabilizer is mounted under the ascent and descent member, the stabilizer being arranged for fixing the supporting member by stopping the movement of the ascent and descent member in response to the first and second piston members being supported on the first and second supporting parts rotation.

9. The friction stir welding apparatus according to claim 7, wherein the stabilizer includes: a wedge type fixing member having a front end inclined like the end of the ascent and descent member, a horizontal through-hole formed therein, and a movable rod elastically supported by an elastic spring inside the horizontal through-hole; and a connection member connected to an end of the movable rod protruding to the outside of the horizontal through-hole of the wedge type fixing member.

10. The friction stir welding apparatus according to claim 8, wherein the stabilizer includes: a wedge type fixing member having a front end inclined like the end of the ascent and descent member, a horizontal through-hole formed therein, and a movable rod elastically supported by an elastic spring inside the horizontal through-hole; and a connection member connected to an end of the movable rod protruding to the outside of the horizontal through-hole of the wedge type fixing member.

11. The friction stir welding apparatus according to claim 9, further including an air cylinder connected to an end of the connection member for moving the connection member back and forth for causing the wedge type fixing member to be advanced to or returned from the end side of the ascent and descent member by the connection member.

12. The friction stir welding apparatus according to claim 10, further including an air cylinder connected to an end of the connection member for moving the connection member back and forth for causing the wedge type fixing member to be advanced to or returned from the end side of the ascent and descent member by the connection member.

13. The apparatus of claim 1 wherein the structure includes a servo-motor for transferring the table through a predetermined distance in an axial direction of the piston.

14. The apparatus of claim 4 wherein the fixed stand includes a vertical through-hole, and an ascent and descent member connected with the lower surface of the supporting member inside the vertical through-hole, the ascent and descent member being elastically supported by an elastic spring.

15. The friction stir welding apparatus according to claim 14, wherein the ascent and descent member has a lower portion protruding to the outside of a narrower path than the vertical through-hole, and the protruding end of the ascent and descent member is inclined at a predetermined slant angle.

16. The friction stir welding apparatus according to claim 14, wherein a stabilizer is mounted under the ascent and descent member, the stabilizer being arranged for fixing the supporting member by stopping the movement of the ascent and descent member in response to the first and second piston members being supported on the first and second supporting parts rotation.

17. The friction stir welding apparatus according to claim 14, wherein a stabilizer is mounted under the ascent and descent member, the stabilizer being arranged for fixing the supporting member by stopping the movement of the ascent and descent member in response to the first and second piston members being supported on the first and second supporting parts rotation.

18. The friction stir welding apparatus according to claim 7, wherein the stabilizer includes: a wedge type fixing member having a front end inclined like the end of the ascent and descent member, a horizontal through-hole formed therein, and a movable rod elastically supported by an elastic spring inside the horizontal through-hole; and a connection member connected to an end of the movable rod protruding to the outside of the horizontal through-hole of the wedge type fixing member.

19. The friction stir welding apparatus according to claim 14, further including an air cylinder connected to an end of the connection member for moving the connection member back and forth for causing the wedge type fixing member to be advanced to or returned from the end side of the ascent and descent member by the connection member.

* * * * *